United States Patent
Woernle et al.

(10) Patent No.: US 10,161,769 B2
(45) Date of Patent: Dec. 25, 2018

(54) SENSOR DEVICE, IN PARTICULAR FOR USE IN A MOTOR VEHICLE

(71) Applicant: Robert Bosch GmbH, Stuttgart (DE)

(72) Inventors: Wolfgang Woernle, Neustetten (DE); Eckart Schellkes, Taipei (TW); Roland Seitz, Nehren (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/535,505

(22) PCT Filed: Nov. 11, 2015

(86) PCT No.: PCT/EP2015/076295
§ 371 (c)(1),
(2) Date: Jun. 13, 2017

(87) PCT Pub. No.: WO2016/096253
PCT Pub. Date: Jun. 23, 2016

(65) Prior Publication Data
US 2017/0343395 A1    Nov. 30, 2017

(30) Foreign Application Priority Data
Dec. 15, 2014   (DE) .................. 10 2014 225 861

(51) Int. Cl.
*G01L 19/00* (2006.01)
*G01D 11/24* (2006.01)
(Continued)

(52) U.S. Cl.
CPC .......... *G01D 11/245* (2013.01); *G01D 11/30* (2013.01); *G01L 19/0084* (2013.01); *G01L 19/142* (2013.01); *G01P 1/02* (2013.01)

(58) Field of Classification Search
CPC . G01D 11/245; G01L 19/0084; G01L 19/142; G01P 1/02
(Continued)

(56) References Cited

U.S. PATENT DOCUMENTS 5,699,243 A * 12/1997 Eckel ................. H05B 37/0227
                                                     315/159
2002/0130656 A1* 9/2002 Hagio .................... B60K 37/02
                                                      324/207.2
(Continued)

FOREIGN PATENT DOCUMENTS

DE          19530413        4/1997
DE       102008000889      10/2009
(Continued)

OTHER PUBLICATIONS

International Search Report for Application No. PCT/EP2015/076295 dated Feb. 15, 2016 (English Translation, 2 pages).

*Primary Examiner* — Max Noori
(74) *Attorney, Agent, or Firm* — Michael Best & Friedrich LLP

(57) ABSTRACT

A sensor device (10) for use in a motor vehicle includes a housing (11) for receiving a sensor element (1). The sensor element (1) has contact surfaces (21 to 23) electrically conductively connected with electrical plug connections (27) arranged in the housing (11), in the region of contacts (24 to 26), wherein the sensor element (1) is applied with force by a housing element (13), in the direction of the contacts (24 to 26) for the purposes of electrical contacting. A support in the form of a 3-point contact is formed between the sensor element (1) and the housing (11). The sensor element (1) has at least two measuring devices (5, 6), and the at least two measuring devices (5, 6) have three contact surfaces (21 to 23) that form the 3-point contact.

12 Claims, 3 Drawing Sheets

(51) Int. Cl.
*G01D 11/30* (2006.01)
*G01L 19/14* (2006.01)
*G01P 1/02* (2006.01)

(58) Field of Classification Search
USPC .......................................................... 73/855
See application file for complete search history.

(56) References Cited

U.S. PATENT DOCUMENTS

| | | | |
|---|---|---|---|
| 2004/0080317 A1* | 4/2004 | Collins | G01D 11/245 |
| | | | 324/262 |
| 2006/0026971 A1* | 2/2006 | Sharpe | G01J 5/0037 |
| | | | 62/126 |
| 2008/0048128 A1* | 2/2008 | Braumandl | G01N 21/645 |
| | | | 250/458.1 |
| 2013/0192361 A1 | 8/2013 | Herderich et al. | |
| 2013/0298688 A1* | 11/2013 | Wade | G01L 1/18 |
| | | | 73/766 |
| 2014/0076037 A1* | 3/2014 | Warren | G01B 7/22 |
| | | | 73/112.01 |

FOREIGN PATENT DOCUMENTS

| | | |
|---|---|---|
| DE | 102011079446 | 2/2013 |
| DE | 102013208537 | 7/2014 |
| JP | H09145512 A | 6/1997 |
| JP | H11261080 A | 9/1999 |
| JP | 2009080095 A | 4/2009 |

\* cited by examiner

SENSOR DEVICE, IN PARTICULAR FOR USE IN A MOTOR VEHICLE

BACKGROUND OF THE INVENTION

The invention relates to a sensor device, in particular for use in a motor vehicle.

A sensor device is known from DE 10 2011 079 446 A1 by the same applicant. The known sensor device, which is designed in the form of a pressure sensor, has a multipartite housing, a sensor element being arranged in the interior of said housing. The sensor element, which has a sensor area, is arranged in a manner operatively connected to an air guide channel which is formed or established within the housing and issues in the region of the sensor area. A sensor device of this kind serves, for example, to identify an accident. To this end, the known sensor device can be arranged, for example, in a vehicle door, wherein a sudden increase in pressure in the air located in the vehicle door takes place owing to an impact or deformation, it being possible for said increase in pressure to be detected by the sensor device. The sensor device can therefore serve, for example, for targeted actuation of airbags or the like. In the sensor device known from said specification, provision is made, in order to simplify mounting or production of the sensor element, for the sensor element to have (electrical) contact areas which are electrically conductively connected to electrical plug connections, which are arranged in the housing, in the region of abutment contacts. In particular, contact is made solely by the sensor element being subjected to the action of force in the direction of the abutment contacts of the plug connections. In this case, a support in the form of a 3-point abutment serves for secure and defined abutment of the sensor element against the abutment contacts or against the housing. A 3-point abutment of this kind prevents, in particular, tilting of the sensor element in relation to the housing which could otherwise possibly lead to electrical interruption between the contact areas and the abutment contacts. In this case, two of the three required support points of the 3-point abutment are formed between the two contact areas of the sensor element and the abutment contacts, which interact with said contact areas, of the plug connections, while the third support area is realized by a corresponding support which is integrally formed in the housing.

SUMMARY OF THE INVENTION

Proceeding from the outlined prior art, the invention is based on the object of developing a sensor device, in particular for use in a motor vehicle, in such a way that sensor elements which have more than one measuring device can also be used while retaining the simple and secure mounting or contact-connection of the sensor element in the housing. A sensor device of this kind can serve, for example, to detect a pressure difference in brake, exhaust or intake systems. In other words, this means that the intention is for it to be possible, in particular, for contact to be made with the sensor element automatically during mounting, wherein the intention is for it to be possible for a plurality of measuring devices to be actuated or read by means of the sensor element.

According to the invention, this object is achieved in that the sensor element has at least two measuring devices, and in that the at least two measuring devices have three contact areas which form the 3-point abutment. In other words, this means that, in contrast to the prior art mentioned in the introductory part, it is not necessary according to the invention to form one of the abutment areas between the housing and the sensor element by the housing itself. Instead, all three supports of the 3-point abutment are formed by electrical contact or abutment areas.

All combinations of at least two features disclosed in the claims, description and/or the figures are covered by the scope of the invention.

In a preferred structural refinement of the 3-point abutment, it is provided that the abutment contacts are of substantially point- or cup-like design and the contact areas preferably have a rectangular, planar shape, and that the size of the contact areas is in each case larger than the area of the abutment contact which is associated with the contact area. As a result, sufficiently accurate and secure contact-connection of the sensor element is always ensured even in the case of a possibly non-100% orientation of the sensor element in relation to the abutment contacts of the plug connections. In particular, a subsequent relative displacement between the sensor element and the abutment contacts does not lead to an interruption in the electrical connection to the sensor element either.

Furthermore, an arrangement or formation of the two measuring devices in such a way that the two measuring devices are arranged with sensor surfaces on opposite end faces of the sensor element, and that the contact areas are located in the region of edge zones of one of the two end faces is particularly preferred. An arrangement of this kind has the advantage, in particular, that, owing to the arrangement of the contact areas at the edges, a distance which is as large as possible is formed between the contact areas, and that the tilting security in the case of the 3-point abutment is improved as a result. At the same time, the arrangement of the contact areas at the edges allows a relatively large region in which the measuring device which is associated with the corresponding end face and has a measuring surface can be arranged.

In a structural development of the last-mentioned concept of the invention, it is provided that the region of the two measuring devices is in each case surrounded by an elastic sealing element, wherein the sealing element in each case has at least one passage opening which connects the measuring device to an air guide channel which is formed in the housing. A refinement of this kind has the advantage, in particular, that the air which is supplied via the air guide channel in the direction of the measuring device acts completely on the measuring devices, without leakage losses. Possible materials for the sealing element are, for example, silicone or similarly elastic materials.

In order to achieve mounting which is as simple as possible, without additional connecting elements which require tools, it is provided that the housing element can be connected to a housing main part of the housing by means of a latching connection, and that a further sealing element is arranged between the housing element and the housing main part, which further sealing element seals off the connection between the housing element and the housing main part. A structural refinement of this kind firstly allows the required abutment force on the sensor element in the direction of the abutment areas to be generated by means of the latching connection, and at the same time allows a media-tight design of the housing to be achieved, in the case of which the possibility of harmful media, in particular liquids or harmful vapors, entering the housing interior is prevented, in spite of the relatively simple connection.

In particular, by means of a latching connection of this kind, it is possible for the abutment force which acts in the direction of the abutment contacts to be generated on the contact areas by means of the latching connection and the sealing element, which faces the housing element, and also the further sealing element.

In order to simplify the mounting process, it is furthermore advantageous when the housing has first guide means for guiding and correctly positioning the sensor element in the direction of the support. First guide means of this kind can be designed, for example, in the form of guide ribs or guide webs which are integrally formed on the main body and the distance between which or the arrangement of which is selected in such a way that the sensor element can be guided or moved in the direction of its support only in the correct position.

Furthermore, for the purpose of secure and reliable mounting, it is provided that the housing has second guide means for guiding and correctly positioning the housing element. Second guide means of this kind can be, for example, in the form of webs which are integrally formed on the main body or the like which interact with corresponding receptacles on the housing element. Mounting of the housing element only in a single position, which is intended for this purpose, on the main body is preferably made possible by corresponding positioning of the webs and receptacles.

Furthermore, for the purpose of connecting the sensor element to one of the two measuring devices, it is advantageous when the housing has a fastening geometry which is designed to connect a connecting element, in particular an air hose, to the housing. A fastening geometry of this kind can be designed, for example, in the form of a connection piece onto which the connecting element can be pushed. In particular, no additional fastening elements are required as a result.

BRIEF DESCRIPTION OF THE DRAWINGS

Further advantages, features and details of the invention can be gathered from the following description of preferred exemplary embodiments and also with reference to the drawing.

In the drawing.

DETAILED DESCRIPTION

Figure 1:
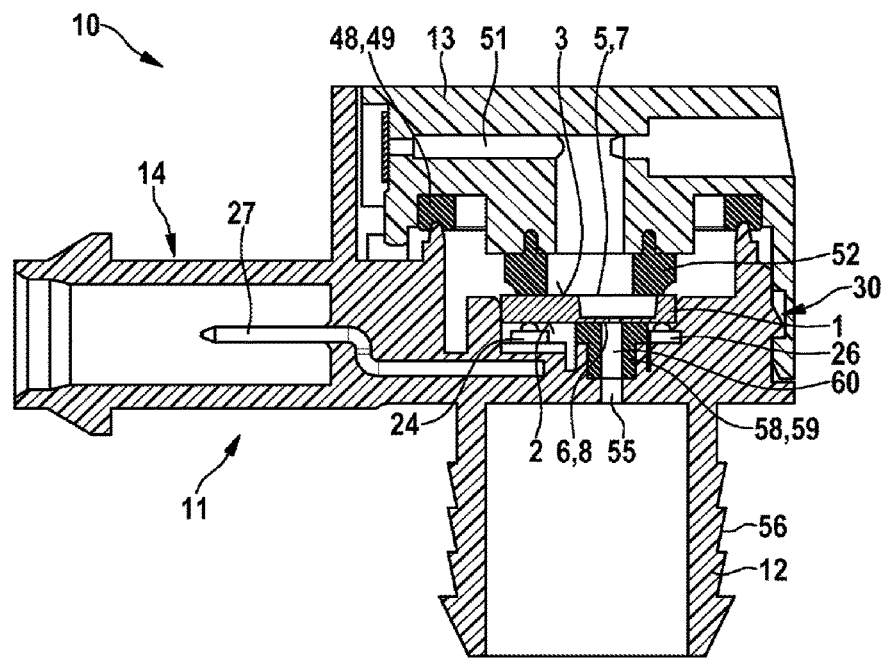
FIG. 1 shows a longitudinal section through a sensor device according to the invention which is provided as a pressure sensor device in a motor vehicle.

Identical elements or elements with the same function are provided with the same reference numerals in the figures.

FIG. 1 shows a sensor device 10 according to the invention as is provided as a differential pressure sensor for use in a motor vehicle. However, the invention is not restricted to pressure sensors when used in motor vehicles, but rather can be transferred to any desired other sensor devices with corresponding adaptations or modifications.

Figure 2:
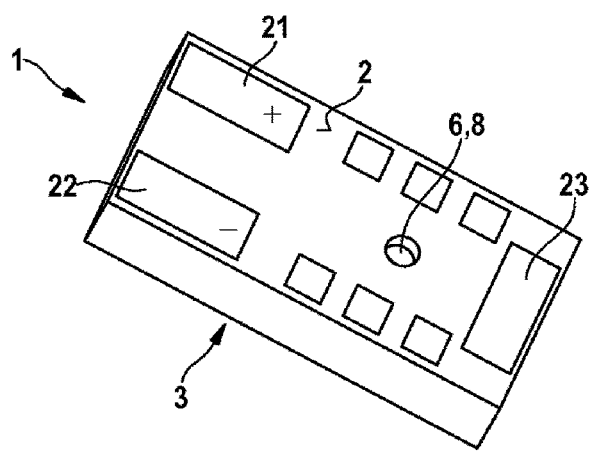
FIG. 2 shows a perspective view of a sensor element, which is used in the case of the sensor device according to FIG. 1, from below.

The sensor device 10 has a housing 11 which substantially comprises a housing main part 12 and a housing cover 13. As can be identified, in particular, by looking at FIGS. 1 and 3 together, the housing 11 comprises an elongate plug connection region 14 which is joined by a receiving region 15, which is substantially round in plan view, for receiving a sensor element 1 which is shown in detail in FIG. 2. The sensor element 1, which is of substantially block-like design, has a sensor surface 7, 8 as a constituent part of a measuring device 5, 6 on each of its two opposite end faces 2, 3.

Three contact areas 21 to 23 for electrically actuating or making contact with the sensor element 1 are arranged in the region of one end face 2 of the sensor element 1. The contact areas 21 to 23 each have an at least approximately rectangular base area, wherein the two contact areas 21, 22 are located on opposite longitudinal sides of the sensor element 1, that is to say in the region of a respective edge zone, and the contact area 23 is located in the region of a narrow side of the sensor element 1 on that side of the sensor element 1 which is situated opposite the contact areas 21, 22. The measuring device 6, by way of its sensor surface 8, is located approximately in a central region of the sensor element 1, that is to say at a distance from the contact areas 21 to 23 which are arranged at the edges.

In the state in which the sensor element 1 is installed in the housing 11, the contact areas 21 to 23 of the sensor element 1 are electrically conductively connected to abutment contacts 24 to 26 which form the end regions of plug connections 27 which are arranged in the housing 11, wherein only a single plug connection 27 is shown in the figures in FIG. 1. During manufacture of the housing 11 or of the housing main part 12, the plug connections 27 are encapsulated in regions by the plastic material of the housing main part 12, wherein, however, the region of the abutment contacts 24 to 26 remains free of the material of the housing main part 12. The abutment contacts 24 to 26 which face the contact areas 21 to 23 are, in particular, of point-like or cup-like design, as can be identified with reference to FIGS. 1 and 3.

Figure 3:
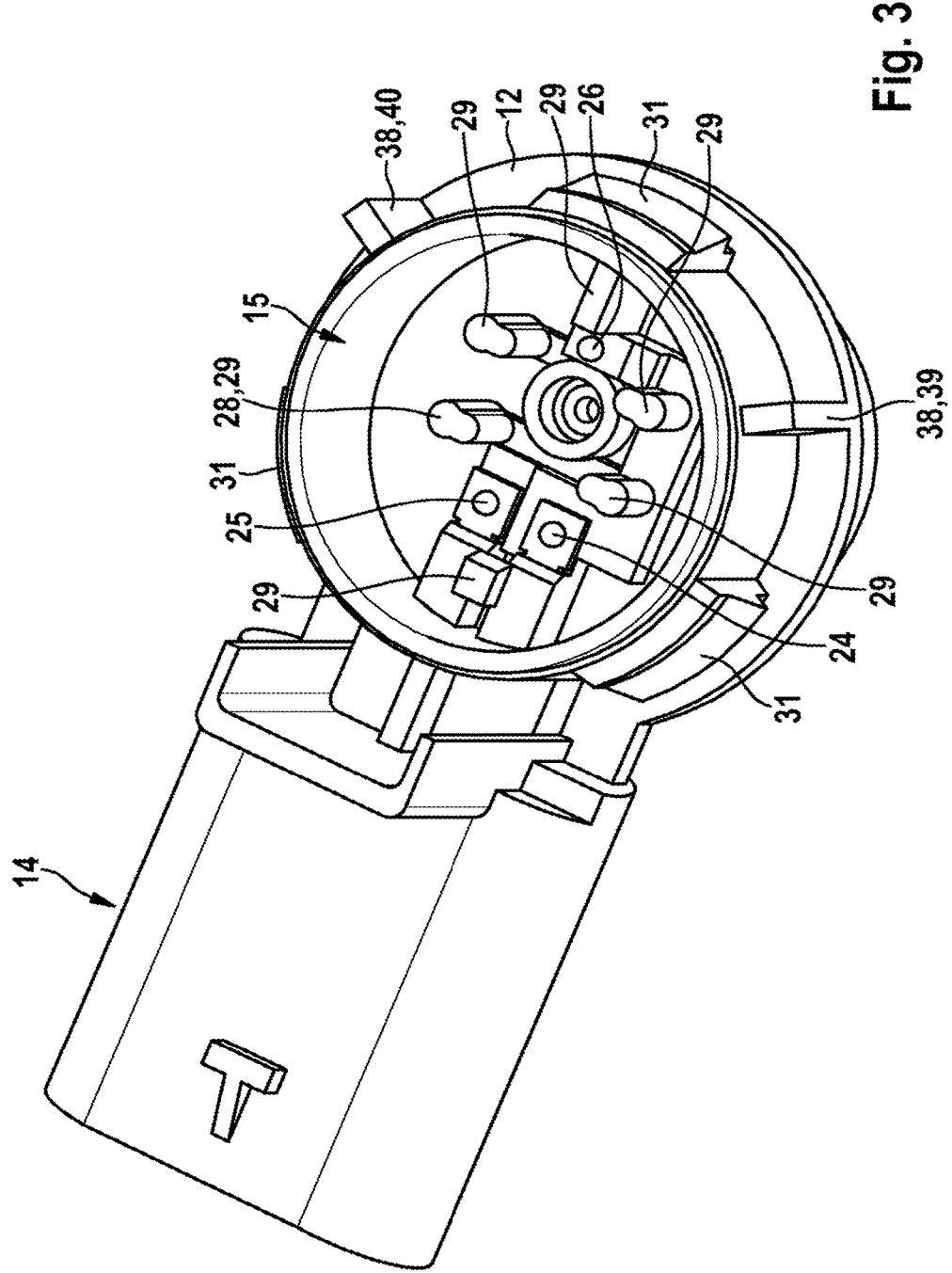
FIG. 3 shows a perspective view of a main body as is used as a constituent part of a housing of the sensor device according to FIG. 1.

As can furthermore be identified in particular with reference to FIG. 3, the housing main part 12 furthermore has, in the receiving region 15, first guide means 28 in the form of, by way of example, six web-like guide ribs 29 which protrude from the base of the receiving region 15 and which are arranged so as to match the cross section or the shape of the sensor element 1 in such a way that the sensor element 1 can be joined or inserted into the receiving region 15 of the housing main part 12 only in one position which allows the abutment contacts 24 to 26 to make contact with the contact areas 21 to 23 in the position intended for this purpose.

The housing main part 12 is connected to the housing cover 13 by means of a latching connection 30. The latching connection 30 has, according to the illustration in FIG. 3, three latching lugs 31 to 33 which are arranged in a manner offset through 120° in relation to one another, and also three latching receptacles 34 to 36 which interact with the three latching lugs 31 to 33 on the housing cover 13. Furthermore, the housing 11 has second guide means 38 which, as can be identified with reference to FIG. 3, comprises, by way of example, two guide rails 39, 40 which are arranged in a manner offset in relation to one another and also two guide receptacles 41, 42 which are formed on the housing cover 13. Appropriate positioning of the guide rails 39, 40 and the guide receptacles 41, 42 ensures that the housing cover 13 can be mounted on the housing main part 12 only with a specific angular position in relation to one another.

Furthermore, the housing cover 13 has two wing-like fastening lugs 43, 44 which are arranged in a manner offset through 180° in relation to one another and have passage openings 45, 46 and by way of which the sensor device 10 can be screwed, for example, to a vehicle body part in the joined state.

A first sealing device in the form of an annular seal 49 is arranged between the housing main part 12 and the housing cover 13. The seal 49 serves to seal off the housing 11 from media entering the receiving region 15 from the surrounding area, in particular liquid. During mounting of the housing cover 13 onto the housing main part 12 by means of the latching connection 30, the seal 49 which is arranged in the housing cover 13 is operatively connected to a corresponding abutment area of the housing main part 12, so that the seal 49 is deformed in regions so as to form the sealing function.

Figure 4:
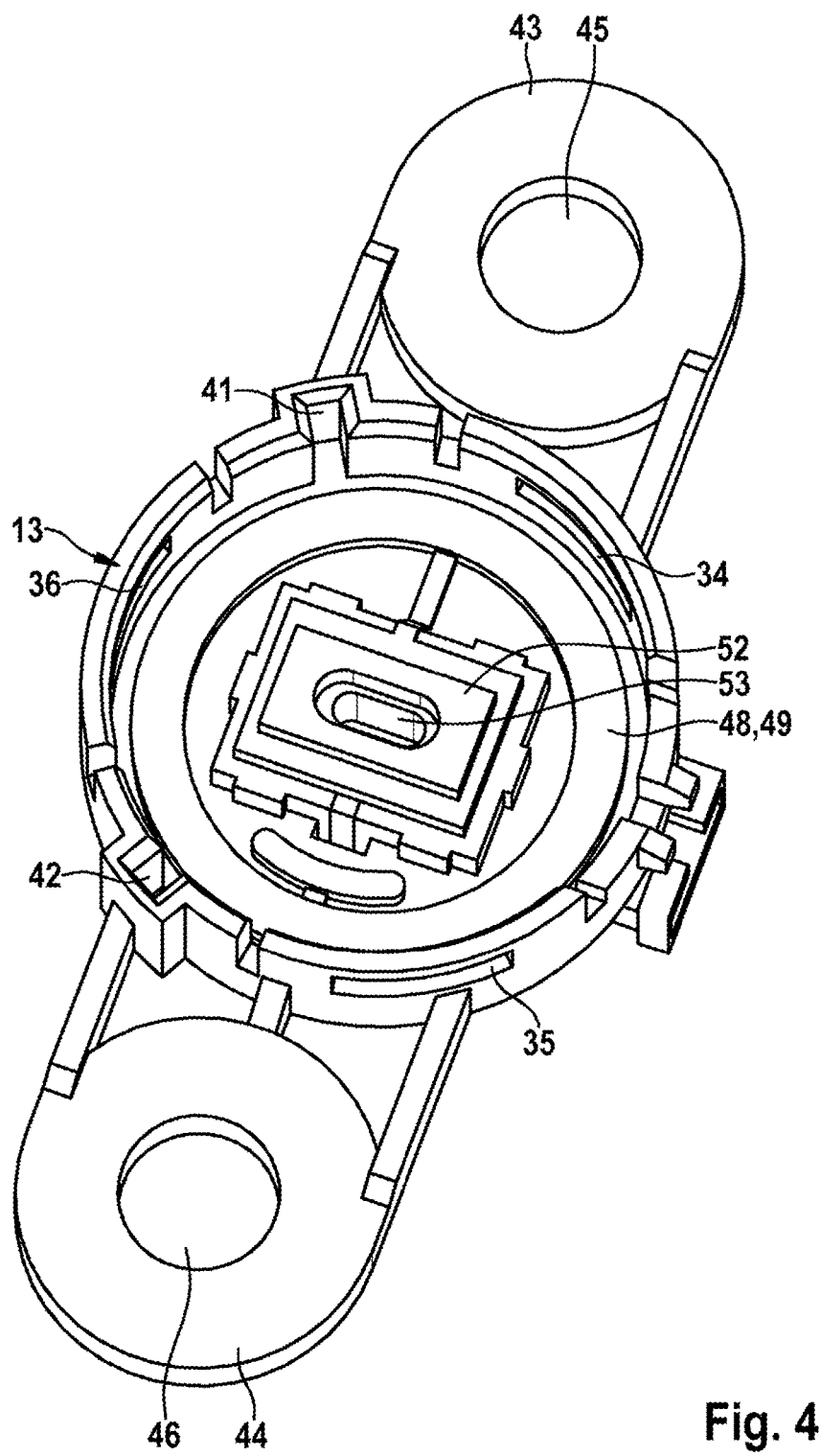
FIG. 4 shows a perspective view of a housing element, which is in the form of a cover, as a constituent part of the housing of the sensor device of FIG. 1.

In the region of the housing cover 13, it has a first air guide channel 51 which is operatively connected to the sensor surface 7 of the measuring device 5. In particular, the ambient pressure can be detected by means of the first air guide channel 51. In the state in which the housing cover 13 is mounted on the housing main part 12, a second sealing device 52 is arranged between the housing main part 12 and the housing cover 13, which second sealing device, according to the illustration in FIG. 4, is of at least approximately rectangular design and has a passage opening 53 in the region of the first air guide channel 51. When the housing cover 13 is mounted on the housing main part 12 by means of the latching connection 30, the housing cover 13 compresses the second sealing device 52 in such a way that it seals off the sensor surface 8 of the measuring device 6 in the direction of the first air guide channel 51.

Furthermore, the housing main part 12 has a second air guide channel 55 which, on that side which faces the sensor element 1, issues in the region of the sensor surface 7 of the measuring device 5. The second air guide channel 55 is operatively connected to another assembly of the motor vehicle, for example an element of the brake system, of the exhaust monitoring arrangement or the like. A connecting element, not illustrated, for example a hose, which can be connected to the housing 11 by means of a fastening geometry 56 which is formed on the outer circumference of the housing main part 12 serves for this purpose.

Furthermore, a third sealing device 58 which is designed in the form of a molded-on or an inserted seal 59 is arranged in the region of the housing main part 12. The seal 59 has a passage opening 60 which is arranged in alignment with the second air guide channel 55 and, when the sensor element 1 is mounted, allows a leakage-free connection in the direction of the second air guide channel 55 in the housing 11.

When the individual parts of the sensor device 10 are mounted, the sensor element 1 is first inserted into the receiving region 15 of the housing main part 12. The housing cover 13 is then operatively connected to the housing main part 12 by means of the latching connection 30. In this case, on account of the tolerance of the components, the latching connection 30 generates an axial supporting force, which acts in the direction of the sensor element 1 and electrically conductively connects the contact areas 21 to 23 of the sensor element 1 to the abutment areas 24 to 26 of the plug contacts 27, by means of the housing cover 13 and by means of the two sealing devices 48 and 52. At the same time, the third sealing device 58, which is associated with the second air guide channel 55, or the seal 59 is compressed by means of the sensor element 1, so that said third sealing device or seal can achieve its sealing effect.

The sensor device 10 described to this extent can be varied or modified in various ways without departing from the concept of the invention. For example, it can be provided that a pressure compensation element is arranged or formed in the housing cover 13. In this respect, reference is made, by way of example and without restriction, to DE 10 2013 208 537 A1 by the same applicant which, in this respect, is intended to be a constituent part of this application.

What is claimed is:

1. A sensor device (10) comprising a housing (11) accommodating a sensor element (1), wherein the sensor element (1) has contact areas (21 to 23) which are electrically conductively connected to electrical plug connections (27), which are arranged in the housing (11), in a region of abutment contacts (24 to 26), wherein the sensor element (1), in order to make electrical contact with the abutment contacts, is subjected by a housing element (13) to the action of force in the direction of the abutment contacts (24 to 26), and wherein a support in the form of a 3-point abutment is formed between the sensor element (1) and the housing (11),
characterized in that the sensor element (1) has at least two measuring devices (5, 6), and in that the at least two measuring devices (5, 6) have three contact areas (21 to 23) which form the 3-point abutment, and wherein sensor surfaces (7, 8) of the measuring devices (5, 6) are arranged on opposite end faces (2, 3) of the sensor element (1), and in that the contact areas (21 to 23) are located in a region of edge zones of one of the two end faces (2, 3).

2. The sensor device as claimed in claim 1,
characterized in that the abutment contacts (24 to 26) are of substantially point- or cup-like design, and in that the size of the contact areas (21 to 23) is in each case larger than an area of the abutment contact (24 to 26) which is associated with the contact area (21 to 23).

3. The sensor device as claimed in claim 1,
characterized
in that the housing (11) has a fastening geometry (56) which is configured to connect an air hose to the housing (11).

4. The sensor device as claimed in claim 1,
characterized in that a region of the two sensor surfaces (7, 8) is in each case surrounded by an elastic sealing element (52, 58), wherein the sealing element (52, 58) in each case has at least one passage opening (53, 60) which connects the sensor surface (7, 8) to an air guide channel (51, 55) which is formed in the housing (11).

5. The sensor device as claimed in claim 4,
characterized
in that the housing element (13) is configured to be connected to a housing main part (12) of the housing (11) by a latching connection (30), and in that a further sealing element (48) is arranged between the housing element (13) and the housing main part (12), which further sealing element seals off a connection between the housing element (13) and the housing main part (12).

6. The sensor device as claimed in claim 5,
characterized in that the force which acts in the direction of the abutment contacts (25 to 27) is generated on the contact areas (21 to 23) by the latching connection (30) and the sealing element (52), which faces the housing element (13), and also the further sealing element (48).

7. The sensor device as claimed in claim 1,
characterized in that the housing (11) has first guide means (28) for guiding and correctly positioning the sensor element (1) in a direction of the 3-point abutment.

8. The sensor device as claimed in claim 7,
characterized in that the housing (11) has second guide means (38) for guiding and correctly positioning the housing element (13).

9. The sensor device as claimed in claim 1,
characterized in that the housing (11) has a fastening geometry (56) which is configured to connect a connecting element to the housing (11).

10. The sensor device as claimed in claim 1,
characterized in that the plug connections (27) are encapsulated in the housing (11) in the region of the abutment contacts (24 to 26) such that the abutment contacts (24 to 26) are left free.

11. The sensor device as claimed in claim 1, wherein the housing element (13) is a housing cover.

12. The sensor device as claimed in claim 1,
characterized
in that the abutment contacts (24 to 26) are of substantially point- or cup-like design and the contact areas (21 to 23) have a rectangular, planar shape, and in that the size of the contact areas (21 to 23) is in each case larger than an area of the abutment contact (24 to 26) which is associated with the contact area (21 to 23).

* * * * *